Patented Nov. 2, 1948

2,453,104

UNITED STATES PATENT OFFICE 2,453,104

AMINOANTHRAQUINONE SULFONAMIDES

Curt G. Vogt, Union, N. J., assignor to General Aniline & Film Corporation, New York, N. Y., a corporation of Delaware No Drawing. Application June 21, 1946, Serial No. 678,356

3 Claims. (Cl. 260—372)

This invention relates to new compounds, more particularly to new acid dyestuffs of the aminoanthraquinone series which in the free state may be represented by the general formula:

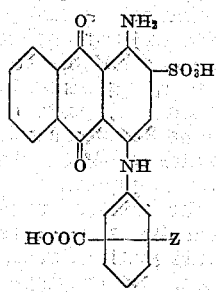

wherein Z represents a sulfonamide radical which may be of the formula:

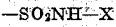

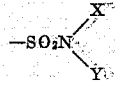

or

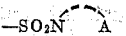

wherein X and Y each represent a saturated aliphatic radical, such as alkyl radicals, alicyclic radicals, such as cyclohexyl and decahydronaphthalene radicals, or aromatic radicals of the benzene, naphthalene and hydrogenated naphthalene series, said radicals may be substituted by carboxy, carbalkoxy, alkoxy, acyloxy, hydroxy, halogen, sulfo and secondary and tertiary alkylamino groups and A represents a bivalent alkylene radical which with the nitrogen atom on the sulfonyl group constitutes a 5 to 7 membered heterocyclic ring.

The new compounds dye animal and nylon (super-polyamide) fibers from an acid bath clear blue to greenish-blue shades of generally good fastness properties.

My new dyestuffs may be prepared by bringing together in an aqueous medium 1-amino-4-bromoanthraquinone-2-sulfonic acid sodium salt, an aminobenzenesulfonamide, a hydrogen ion acceptor, such as sodium carbonate or bicarbonate, and a catalyst, such as copper, cuprous or cupric salts, e. g., cuprous chloride, and heating until condensation is complete. The product dyestuff may be isolated by acidifying the reaction mixture or by the addition of a salt thereto such as sodium chloride. The dyestuff may be purified by means of well-known procedures.

The aminobenzenesulfonamides employed as intermediates in the preparation of the new compounds may be prepared by reacting chlorobenzoic acid with chlorosulfonic acid to obtain the carboxychlorobenzenesulfonylchloride, which, in turn, is reacted with the selected primary or secondary amino compound or alicyclic imine to produce the carboxychlorobenzenesulfonamide. The latter is then aminated with ammonium hydroxide in the presence of a copper catalyst, e. g., copper sulfate, to obtain the desired aminocarboxybenzenesulfonamide.

Among the amino compounds which may be employed for the preparation of the intermediate aminobenzenesulfonamides are, for example, mono- and di-methyl amine, mono- and di-ethyl amine, mono- and di-isopropyl amine, cyclohexylamine, hexahydrobenzylamine, hexahydroanthranilic acid, N-methyl glycine, glycine, alanine, ethyl - ω - aminocaproate, taurine, N - methyl taurine, β-aminoethyl acetate, mono- and diethanolamine, β-ethoxyethylamine, β-bromoethylamine, p-toluidine, 4-amino-o-xylene, 2-nitro-p-anisidine, o-, m- or p-aminobenzoic acid, 5-aminosalicylic acid, 2-amino-4-methylbenzoic acid, 5-nitro-2-aminobenzoic acid, 2-chloro-p-aminobenzoic acid, aniline-o-, m- or p-sulfonic acid, p-phenylenediamine, 1-hydroxy-4-amino-2-naphthoic acid, 3-hyroxy-7-amino-2-naphthoic acid, ac.-tetrahydro-α-naphthylamine, and ar.-tetrahydro-α-naphthylamine, etc. Among the alicyclic imines suitable for the preparation of the intermediates may be mentioned, for example, tetramethylene imine (pyrrolidine), pentamethylene imine (piperidine), 2- and 3-methylpiperidine, hexamethylene imine, etc.

The invention is further illustrated by the following specific examples to which, however, it is not intended that it be limited. Parts are by weight.

Example 1.

A solution of 25 parts of 5-(2'-carboxyphenylsulfamyl)-anthranilic acid in 300 parts of water containing 30.2 parts of sodium bicarbonate was added to 20.2 parts of 1-amino-4-bromoanthraquinone-2-sulfonic acid sodium salt in 200 parts of water. 1.5 parts of cuprous chloride was then added and the mixture heated under stirring at 75° C. for 18 hours. At the end of this time the mixture was a deep ruby color to which, after cooling, was added 60 parts of concentrated hydrochloric acid. The dyestuff settled out in the form of large non-sticky masses which were isolated by decantation.

To purify the dyestuff, it was dispersed in 500 parts of water at 60° C., the resulting solution filtered, and to the deeply blue filtrate at 60° C. was added sufficient sodium chloride to precipitate the dyestuff. After separation by filtration, the dyestuff was again subjected to the dissolution and precipitation steps, whereupon the precipitate was washed with sodium chloride solution (10% aqueous). The purified dyestuff was dried at 90° C. and ground. It has the formula:

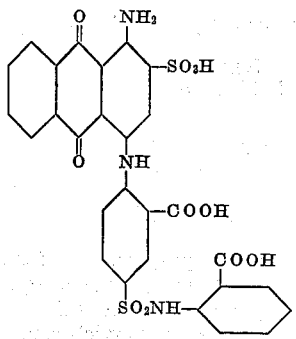

and dyes animal fibers from an acid bath attractive blue shades of good properties.

*Example 2*

Following essentially the procedure of Example 1, a mixture of 24.5 parts of 5-(3'-carboxy-4'-hydroxyphenylsulfamyl)-anthranilic acid, 20.2 parts of 1-amino-4-bromoanthraquinone-2-sulfonic acid sodium salt, 27 parts of sodium bicarbonate and 1.5 parts of cuprous chloride in 500 parts of water was heated at 75° C. for six hours, and the product dyestuff isolated and purified. The dyestuff has the formula:

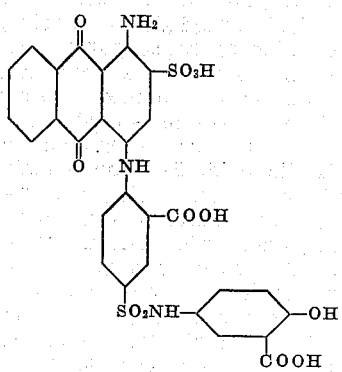

It dyes wool from an acid bath attractive greenish-blue shades of good fastness, especially to light. When dyed by the monochrome method, the shade is much greener.

*Example 3*

To 20 parts of 5-(N'-(2'-carboxyphenyl)-N'-methylsulfamyl)-anthranilic acid and 20.5 parts of sodium acetate in 150 parts of water at 80° C. was added a suspension of 12.1 parts of 1-amino-4-bromoanthraquinone-2-sulfonic acid sodium salt in 300 parts of water, also at 80° C. 1 part of cuprous chloride was added and the reaction mixture heated to 95° C. and held at this temperature under stirring for three and one-half hours. The reaction mixture was cooled to 75° C. and 110 parts of sodium chloride solution (20% aqueous) were added slowly. This mixture was allowed to cool to 40° C. and filtered.

The dyestuff was purified by dissolving the filter cake in 1000 parts of water at 80° C., filtering, and adding dropwise to the filtrate at 70° C., 25 parts of hydrochloric acid (10%). On cooling, the dyestuff precipitated and was readily separated by filtration. The filter cake was stirred with 200 parts of cold water, refiltered and dried. The dyestuff has the formula:

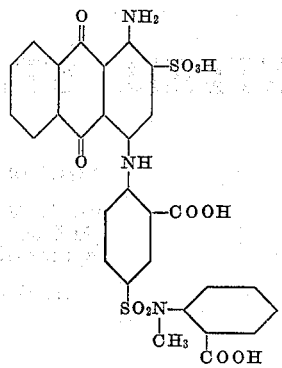

It dyes wool from an acid bath attractive blue shades of good fastness to light and fulling.

*Example 4*

To a suspension of 13.2 parts of 5-(1'-piperidylsulfonyl)-anthranilic acid in 250 parts of water at 75° C. was added 2.25 parts of sodium carbonate as a 5% aqueous solution. To the resulting solution was added a suspension of 10 parts of sodium acetate and 10.1 parts of 1-amino-4-bromoanthraquinone-2-sulfonic acid sodium salt in 150 parts of water at 60° C. There was further added 1 part of cuprous chloride and the temperature of the mixture raised to 90–95° C. and maintained thereat for three hours. To the reaction mixture at 80° C. was added 50 parts of sodium chloride. On cooling to 50° C., the dyestuff precipitated and was then filtered off.

The dyestuff was purified by dissolving in 600 parts of water, filtering, and to the filtrate at 75° C. adding 50 parts of hydrochloric acid (10%). The mixture was cooled and the precipitated dyestuff separated by filtration, the filter cake washed with 100 parts of cold water and redissolved in 100 parts of dilute sodium carbonate solution. 20 parts of sodium chloride was then added to the solution and dilute hydrochloric acid until precipitation had occurred. The precipitate was filtered off and triturated with a small amount of ammonia and dried. The dyestuff has the formula:

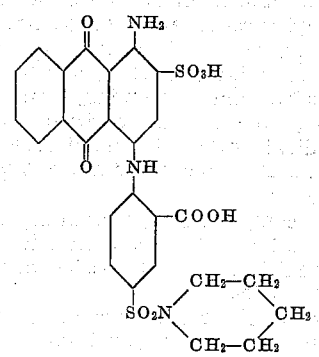

It dyes wool from an acid bath attractive blue shades.

*Example 5*

A mixture of 22.4 parts of 5-(cyclohexylsulfamyl)-anthranilic acid and 300 parts of water containing 19 parts of sodium bicarbonate and 5.3 parts of sodium carbonate was added to a suspension of 20.2 parts of 1-amino-4-bromoanthraquinone-2-sulfonic acid sodium salt in 100 parts of water. 1.5 parts of cuprous chloride and 100 parts of water were then added. The reaction mixture was maintained at 95° C. under stirring for 18 hours. The dyestuff was brought down by the addition to the reaction mixture at 80° C. of 110 parts of sodium chloride and sufficient dilute hydrochloric acid to cause precipitation. The filtered product was purified by repeated re-precipitations with dilute hydrochloric acid from solutions containing the dyestuff and sodium chloride. The dyestuff has the formula:

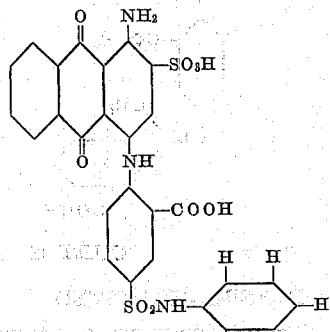

*Example 6*

A mixture of 21.4 parts of 5-(p-tolylsulfamyl)-anthranilic acid, 20.2 parts of 1-amino-4-bromoanthraquinone-2-sulfonic acid sodium salt, 24.2 parts of sodium bicarbonate and 1.5 parts of cuprous chloride in 500 parts of water was heated to 75–78° C. under stirring for 6 hours. The dyestuff was isolated and purified following essentially the procedure in Example 1. The dyestuff has the formula:

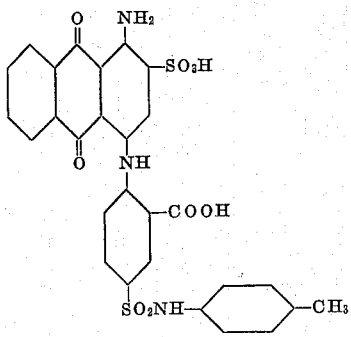

It dyes wool from an acid bath attractive blue shades of good fastness.

*Example 7*

A mixture of 13.68 parts of 5-diethylsulfamyl-anthranilic acid, 16.16 parts of 1-amino-4-bromoanthraquinone-2-sulfonic acid sodium salt, 11.58 parts of sodium acetate and 1 part of cuprous chloride in 400 parts of water was stirred at 95° C. for one and one-half hours. The dyestuff was isolated and purified following essentially the procedure in Example 1. The dyestuff has the formula:

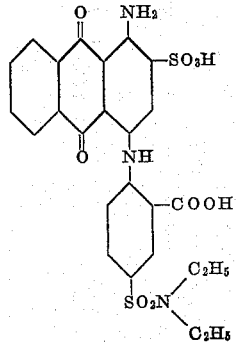

It dyes wool, silk and synthetic linear polyamide fibers from an acid bath blue shades of good light fastness.

*Example 8*

A mixture of 13.7 parts of 5-(carboxymethylsulfamyl)-anthranilic acid and 100 parts of water containing 5 parts of sodium carbonate was added to 14.1 parts of 1-amino-4-bromoanthraquinone-2-sulfonic acid sodium salt in 250 parts of warm water. 8 parts of sodium acetate and 0.5 part of cuprous chloride were then added. The suspension was maintained at 90° C. for sixteen hours with stirring. The dyestuff was isolated by addition of sodium chloride followed by acidification with hydrochloric acid. Purification was achieved by well-known methods such as dissolution followed by addition of salt or acid. The purified dyestuff has the formula:

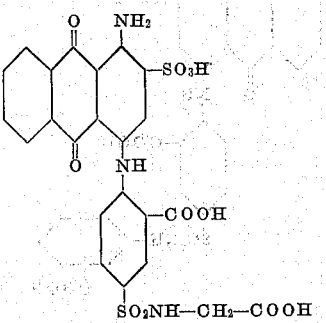

and yielded attractive reddish-blue shades on wool. The fastness to light was good.

*Example 9*

To 11.2 parts of 5-[N-methyl-N-(2'-sulfoethyl)sulfamyl]-anthranilic acid in 100 parts of water was added 7.4 parts of sodium acetate. Then was added a suspension of 14.2 parts of 1-amino-4-bromoanthraquinone-2-sulfonic acid sodium salt in 100 parts of water, and 0.5 part of cuprous chloride. The mixture was stirred at 80° C. until condensation was complete. The dyestuff isolated from the reaction mixture and purified by the usual methods has the formula:

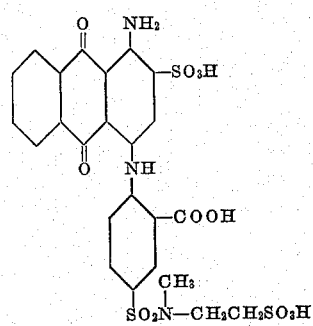

and dyes wool in blue shades.

As various other embodiments of the invention will occur to those skilled in the art, it is not intended that the scope of the patent be limited except as is required by the prior art and the appended claims.

I claim:

1. An aminoanthraquinone compound of the general formula:

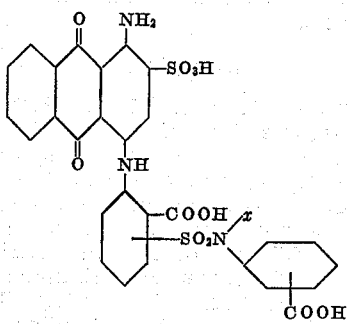

wherein $x$ represents a radical selected from the group consisting of hydrogen and lower alkyl.

2. An aminoanthraquinone compound of the general formula:

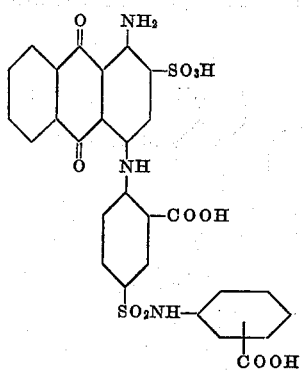

3. An aminoanthraquinone compound of the general formula:

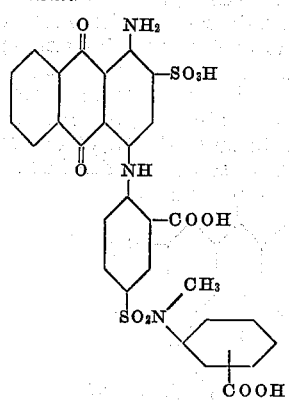

CURT G. VOGT.

REFERENCES CITED

The following references are of record in the file of this patent:

UNITED STATES PATENTS

| Number | Name | Date |
|---|---|---|
| 2,195,067 | Weinand et al. | Mar. 26, 1940 |

FOREIGN PATENTS

| Number | Country | Date |
|---|---|---|
| 554,324 | Germany | July 11, 1932 |